United States Patent [19]

Cromwell

[11] Patent Number: 5,443,018
[45] Date of Patent: Aug. 22, 1995

[54] FOLDING TRAY FOR ATTACHMENT TO A VEHICLE SEAT BACK

[76] Inventor: Carl E. Cromwell, 829 Shady Lake Dr., Bedford, Tex. 76021

[21] Appl. No.: 152,678

[22] Filed: Nov. 15, 1993

[51] Int. Cl.⁶ ............................................. A47B 23/00
[52] U.S. Cl. ........................................................ 108/44
[58] Field of Search ................... 108/44, 43, 42, 46, 108/25

[56] References Cited

U.S. PATENT DOCUMENTS

| | | | |
|---|---|---|---|
| 2,503,602 | 4/1950 | Titley | 108/44 X |
| 2,633,998 | 4/1953 | Delman | 108/44 X |
| 3,207,567 | 9/1965 | Brady | 108/44 X |
| 3,804,031 | 4/1974 | Pitts | |
| 3,922,973 | 12/1975 | Sturgeon | |
| 4,770,107 | 9/1988 | Miller | 108/44 |
| 4,852,498 | 8/1989 | Judd | 108/43 X |
| 4,915,437 | 4/1990 | Cherry | 108/44 X |
| 4,940,003 | 7/1990 | Mayhew et al. | |
| 4,942,827 | 7/1990 | Norgaard | |
| 4,995,322 | 2/1991 | Frederick | 108/44 |
| 5,046,433 | 9/1991 | Kramer et al. | 108/44 |
| 5,075,897 | 12/1991 | Daniels | 108/43 X |
| 5,143,337 | 9/1992 | Tomayko, Jr. et al. | 108/44 X |
| 5,197,381 | 3/1993 | Mells | 108/44 |

Primary Examiner—Jose V. Chen
Attorney, Agent, or Firm—H. Dennis Kelly; Timmons & Kelly

[57] ABSTRACT

A first box and a second box are connected to a base member. The base member may be attached to the back of a vehicle seat with a mounting harness. The second box and the first box can be moved to an open position, away from the seat back. The tops of the boxes can then be opened, or folded up to form an easel for holding a book. A handle is provided for using the invention apart from a vehicle.

1 Claim, 4 Drawing Sheets

FOLDING TRAY FOR ATTACHMENT TO A VEHICLE SEAT BACK

BACKGROUND OF THE INVENTION

1. Field of the Invention

This invention relates in general to a folding tray. In particular, the invention relates to a folding tray attached to the back of a seat in a vehicle.

2. Description of Related Art

Fold-down trays have been used for many years on passenger airliners. Such trays are permanently mounted on a seat back, and generally consist of a single tray that folds downward from the seat back.

Folding trays have also been designed for use in passenger cars. Such trays provide a flat surface with space for work or play. One example is the tray shown in U.S. Pat. No. 5,046,433, issued to Kramer et. al. The Kramer et al. tray has a frame mounted on the vehicle seat back. A single tray folds downward from the frame, and has sides and a drink holder. The tray does not have covered containers, nor does it provide an easel.

U.S. Pat. No. 4,942,827, issued to Norgaard, shows an automobile desk that does provide covered compartments. However, the Norgaard device is designed to be installed on the seat between passengers, rather than being mounted on the seat back.

SUMMARY OF THE INVENTION

The general object of the folding tray of the invention is to provide a folding tray for attachment to a vehicle seat back, in which the folding tray has a first box and a second box. The folding tray is readily attachable to a mounting harness on the seat back. The first box can be pivoted between a closed position, toward the seat back, and an open position downward away from the seat back. The second box is connected to the first box and can be moved between a closed position substantially adjacent the first box, and an open position substantially away from the vehicle seat.

The above, as well as additional objects, features, and advantages of the invention will become apparent in the following detailed description.

DESCRIPTION OF THE PREFERRED EMBODIMENT

Figure 1:
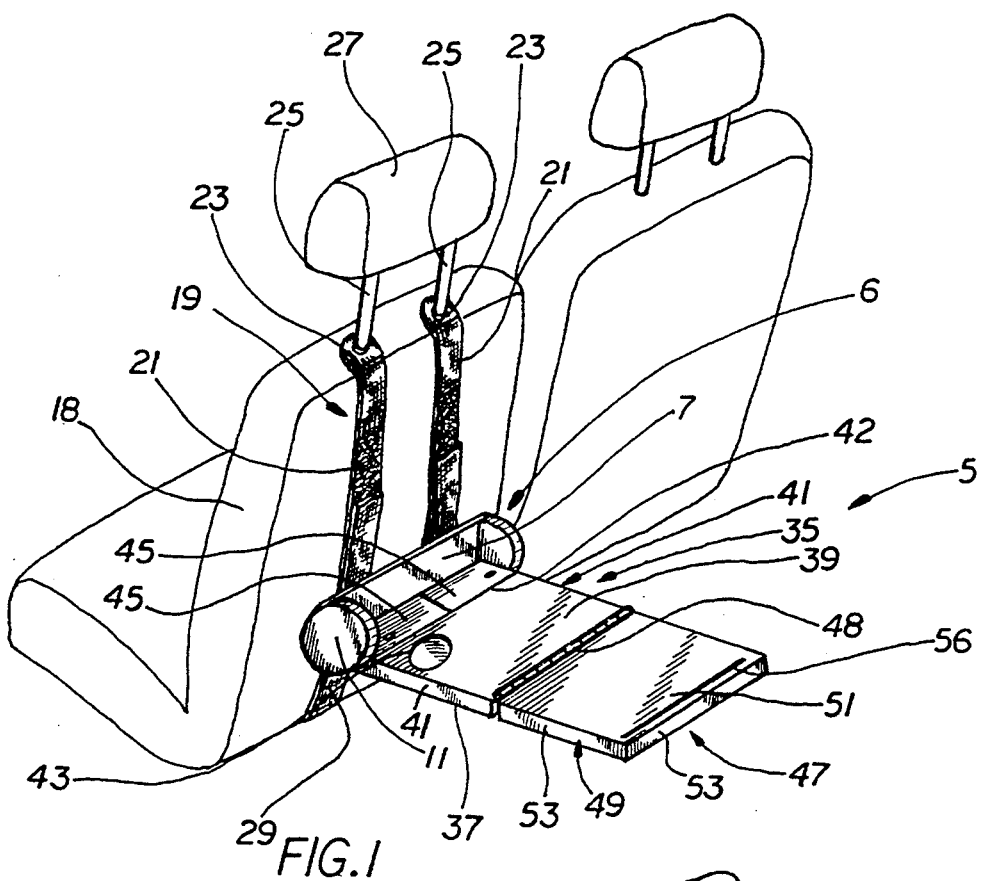
FIG. 1 is a perspective view of a folding tray according to one embodiment of the invention, with both boxes in the open position and with the tops of said boxes closed.

A first embodiment of the folding tray 5 of the invention is shown in FIGS. 1-4. The folding tray 5 has a base member 6 made of a hard plastic. The base member 6 includes a rectangular portion 7 and a circular support 11 attached to each end of the rectangular portion 7.

The base member 6 is attached to the back of a vehicle seat 18 by means of a mounting harness 19. The mounting harness 19 includes two straps 21, which may or may not be connected to one another. Each strap 21 has an upper hook 23 for hanging the strap 21 on a post 25 of a head rest 27. A lower hook 29 may be located on the lower end of each strap 21 for attachment to the vehicle seat 18. The straps 21 may be elastic, or elastic material may be connected between strap 21 and one or both of the hooks 23 or 29.

Figure 3:
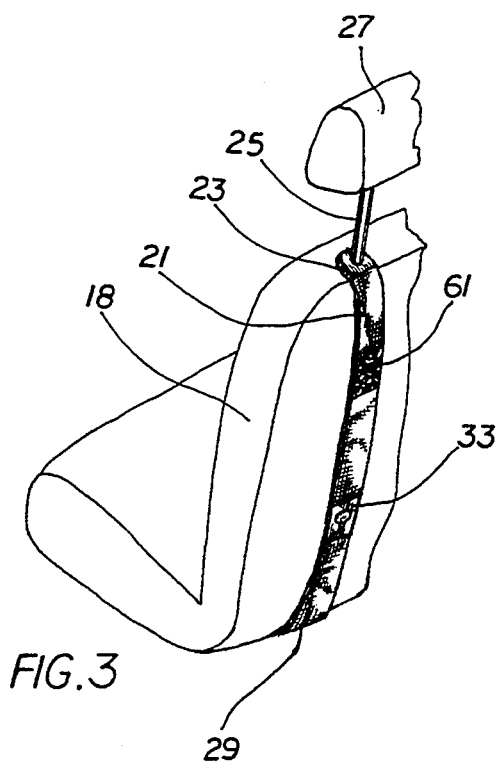
FIG. 3 is a perspective view of the mounting harness shown in FIG. 1
Figure 4:
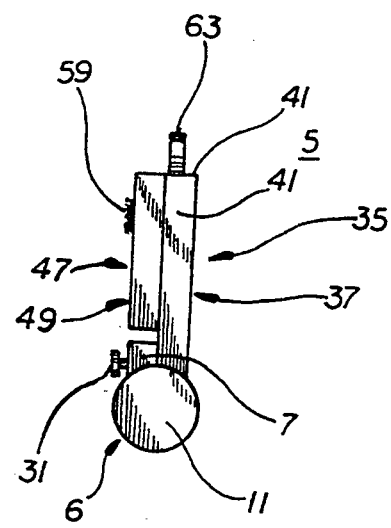
FIG. 4 is a side elevation of the folding tray of FIG. 1, with both boxes in the closed position.

The attachment of the base member 6 to the mounting harness 19 is illustrated in FIGS. 3 and 4. A projection 31 on the rear of the rectangular portion 7 of the base member 6 fits into a key-shaped hole 33 in the mounting harness 19. A second projection on the rectangular portion 7 may fit within another key-shaped hole 33 in the other strap 21 of the mounting harness 19. The folding tray 5 may be removed from the vehicle seat 18 by lifting upward on the base member 6 and removing the projections 31 from the holes 33 in the mounting harness 19.

Returning to FIGS. 1 and 2, a first box 35 is connected to the base member 6 with a hinge (not shown). The first box 35 can be pivoted between an open position, shown in FIGS. 1 and 2, and a closed position, shown in FIG. 4. The open position is downward away from the vehicle seat 18, and the closed position is upward toward the vehicle seat 18. The first box 35 is held between the circular supports 11 by a suitable means, such as a ratchet or a threaded tightening means, for holding the first box 35 in the open or closed position.

The first box 35 has a bottom 37, a top 39, and four sides 41. The top 39 of the first box 35 is connected to the rest of the box 35 with a hinge 42, so the top 39 can be raised to open the box 35. The top 39 may also have a circular hole 43 for holding a cup. The top 39 and bottom 37 of the first box 35 may be made of a thin sheet of steel, so that magnetic playing pieces will stick to the surface of the box 35. The exterior edges of the box 35 are rounded and padded as an additional safety feature.

The top 39 covers a substantial portion of the first box 35, but a portion of the first box 35 adjacent to the base member 6 is covered by a pair of sliding doors 45. The sliding doors 45 cover a small portion of the first box 35 for storing small pieces, such as game pieces, pens, pencils, or color markers.

A second box 47 is connected to the first box 35 with a hinge 48, and can be pivoted between an open position and a closed position. In the open position, shown in FIGS. 1 and 2, the second box 47 is away from the vehicle seat back 18. In the closed position, shown in FIG. 4, the second box 47 is adjacent to the first box 35.

The second box 47 has a bottom 49, a top 51, and four sides 58. The top 51 of the second box 47 is connected to the top 39 of the first box 35 with a hinge 54, so that the top 51 can be raised to open the second box 47. The top 51 and bottom 49 of the second box 47 may be made of a thin sheet of steel, so that magnetic playing pieces will stick to the surface of the box 47.

Figure 2:
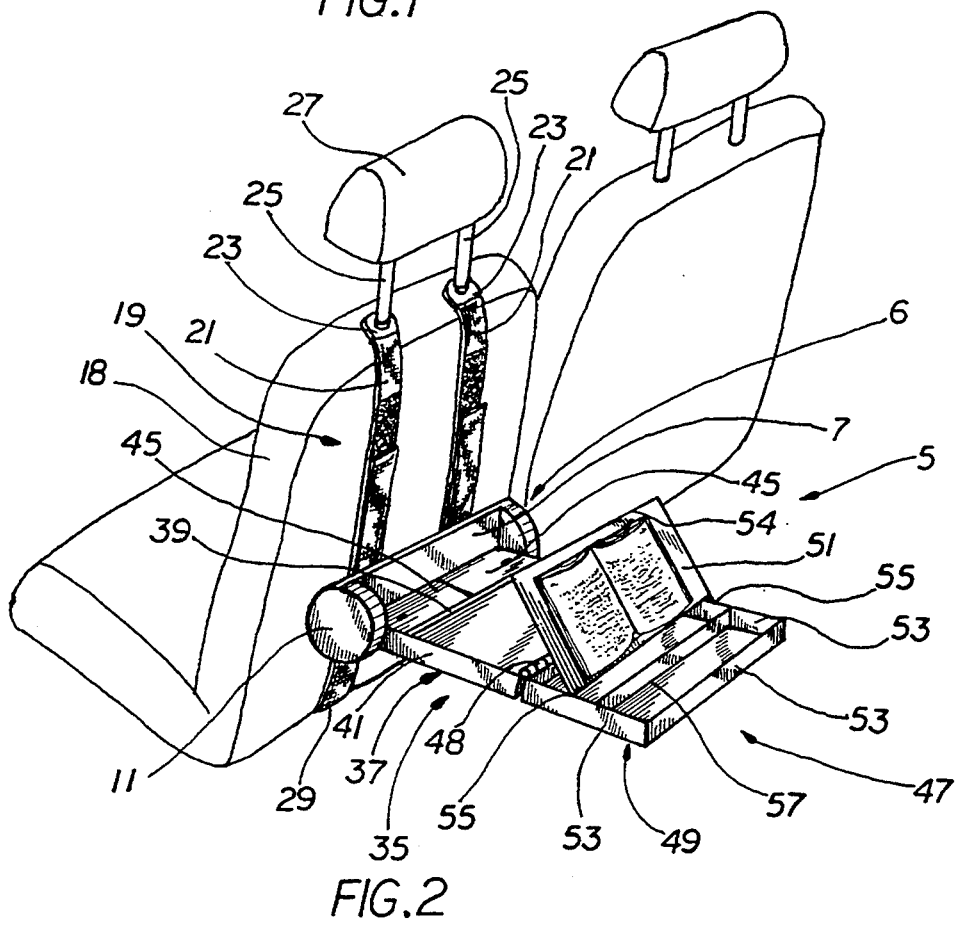
FIG. 2 is a perspective view of the embodiment of FIG. 1, with both boxes in the open position and with the tops up in the easel position.

The hinge 54 between the two tops 39 and 51 allows the top 51 of the second box 47 to pivot in either direction. Thus, the second box 47 may be opened by raising the top 51, or by raising the hinged connection, as shown in FIG. 2. A plurality of notches 55 on the upper interior edges of the sides 53 of the second box 47 hold the top 51 in a selected position. This position forms an easel, which may be used to hold a book, as shown in FIG. 2. A ledge 56 on the surface of the top 51 of the second box 47 holds the book at a convenient level.

The second box 47 has an inner partition 57 to divide the box 47 into sections. A small section of the second box 47 is convenient for storing pencils and other materials. The exterior edges of the second box 47 are rounded and padded as an additional safety feature.

Figure 8:
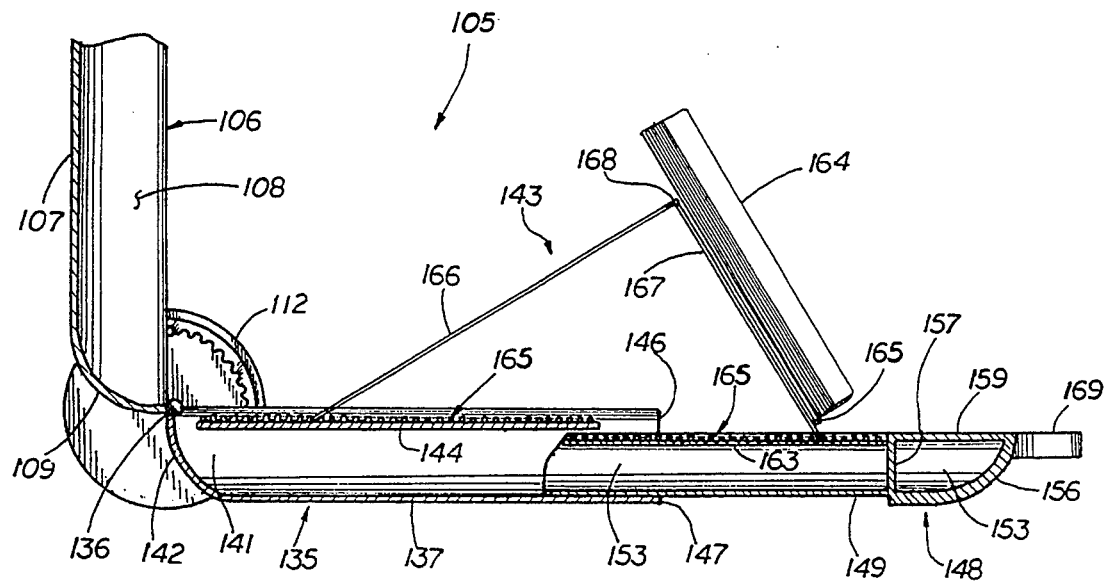
FIG. 8 is a sectional view along lines 8—8 in FIG. 6, with the top assembly raised to the easel positions.

As shown in FIG. 8, a hook and loop fastener is used to secure the second box 47 to the mounting harness 19. The folding tray 5 is thus held in a substantially upright and closed position adjacent to the seat back 18. The hook portion 59 of the fastener is located on the bottom 49 of the second box 47. The loop portion 61 of the fastener is located on the straps 21 of the harness 19.

When the folding tray 5 is removed from the vehicle seat back 18, a handle 63 on the side 41 which is adjacent to the hinge 48 facilitates handling of the folding tray 5. The handle 63 folds down flat against the side 41 of the first box 35 when the boxes 35 and 47 are in the open position.

An alternate embodiment of the folding tray 105 of the invention is shown in FIGS. 5-9. The alternate folding tray 105 has a base member 106, which has a rectangular back 107, a pair of lateral sides 108, a base side 109, an upper side 110. A circular support 112 is attached to the base-side end of each of the lateral sides 108.

A collapsible folder 111 for holding papers, magazines, gameboards, and the like is attached between the lateral sides 108 of the base member 106. The folder 111 includes a pair of accordion sides 113, each of which is connected between one of the lateral sides 108 and an outward edge of a substantially flat interior surface portion 114 of the collapsible folder 111. A pair of flexible fastening straps 115 are connected to the lateral sides 108 and a snap on each fastening strap 115 attaches to a snap 117 on the folder 110.

Figure 5:
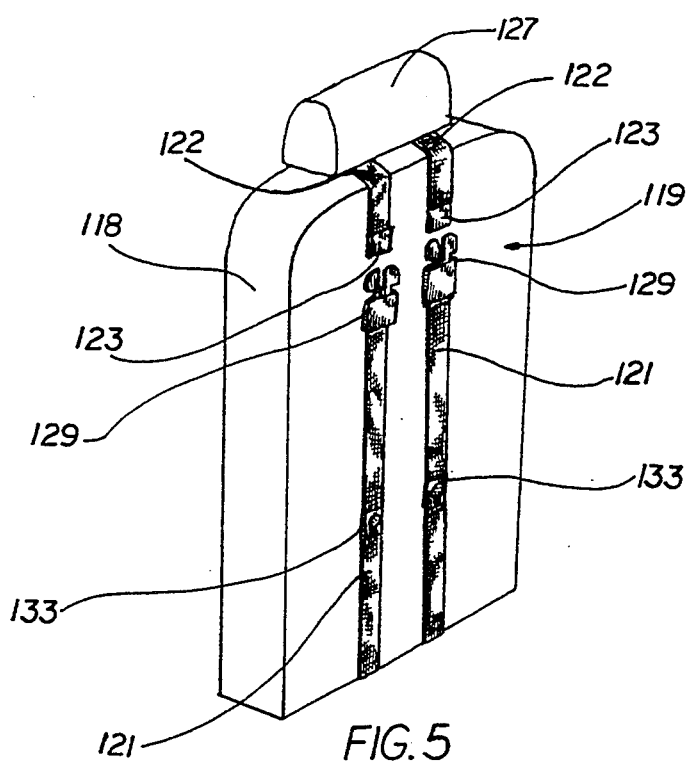
FIG. 5 is a perspective view of a mounting harness according to a second embodiment of the invention.
Figure 6:
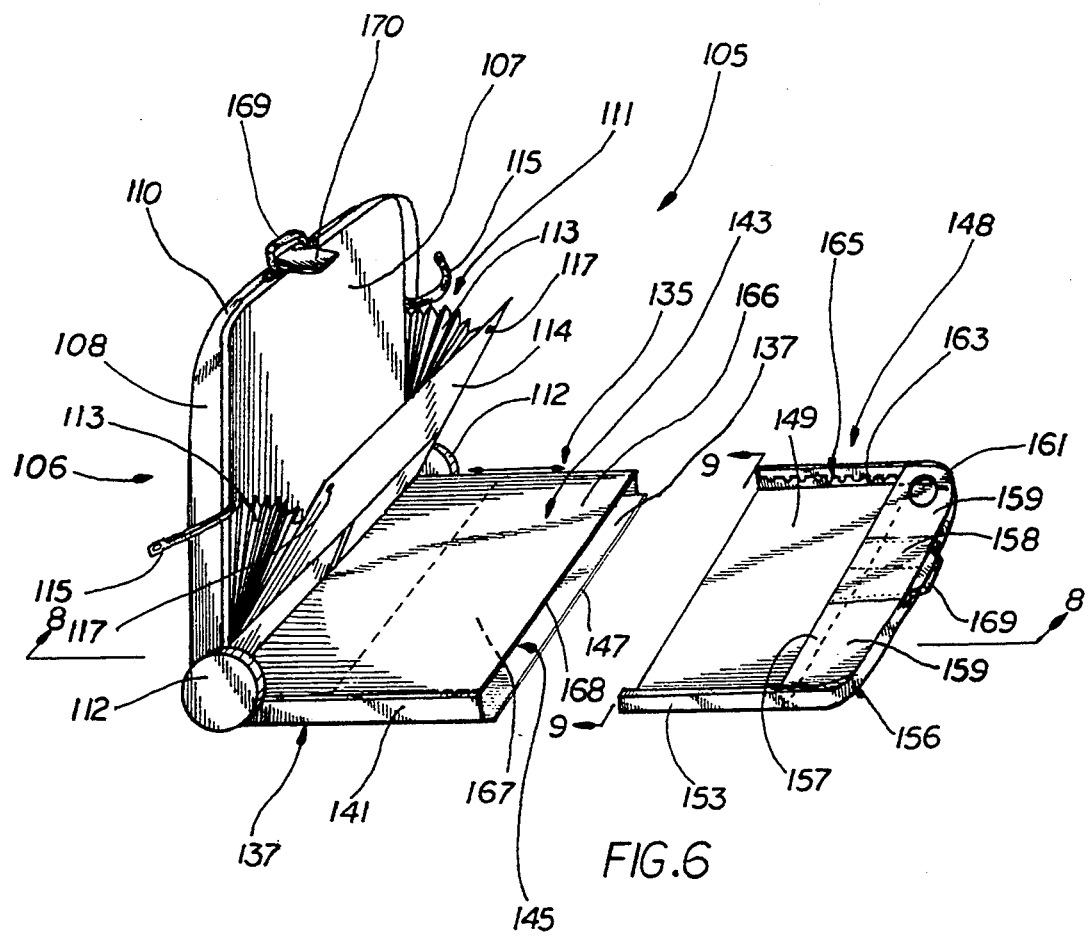
FIG. 6 is a perspective view of a folding tray according to the second embodiment of the invention, with both boxes in the open position.

The base member 106 is attached to the back of a vehicle seat 118 by means of a mounting harness 119, shown in FIG. 5. The mounting harness 119 includes a lower strap 121 and an upper strap 122. The upper strap 122 is centered around a post connecting a headrest 127 to the seat 118, and includes a pair of female friction fasteners 123. The lower strap 121 is centered around a portion of the lower frame (not shown) of the seat 118, and includes a pair of mole friction fasteners 129 for engaging the female fasteners 123. The straps 121 and 122 are made of a non-elastic material. The fasteners 123 and 129 are made of a hard plastic for economical manufacture via injection molding.

Figure 7:
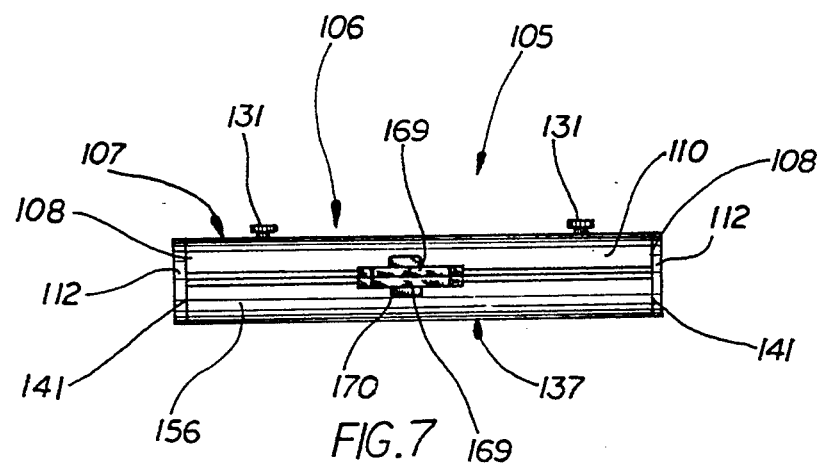
FIG. 7 is a top plan view of the folding tray of FIG. 6, with both boxes in the closed position.

The attachment of the folding tray 105 to the mounting harness 119 is illustrated in FIGS. 5 and 7. A pair of projections 131 on the rear of the base member 106 of the folding tray 105 fit into a corresponding pair of key-shaped hole attachments 133 of the mounting harness 119. The attachments 133 are made of a hard plastic and are slidably affixed to the mounting harness 119. The folding tray 105 may be removed from the vehicle seat 118 by lifting upward on the base member 106 and removing the pair of projections 131 from the pair of key-shaped hole-attachments 133 of the mounting harness 119.

The alternate folding tray 105 includes first box 135, having a bottom 137 and a pair of lateral sides 141 affixed to each end of a base side 142. The base side 142 of the first box 135 is connected to the base side 109 of the base member 106 with a hinge 136, between the circular supports 112. The first box 135 can be pivoted between an open position, shown in FIGS. 6, 8 and 9, and a closed position, shown in FIG. 7. The open position is downward away from the seat back 118, and the closed position is upward toward the seat back 118 and substantially adjacent to the base member 106. The first box 135 is held between the circular supports 112 by a suitable means, such as a ratchet or a threaded tightening means, for holding the first box 135 in the open or closed position. The lateral sides 141 and base side 142 of the first box 135 are at right angles to the bottom 137.

A top assembly 143 is supported between the free edges of the sides 141 of the first box 135 on a first pair of shelves 144. The shelves 144 are affixed to one of the sides 141 near one of the free edges. The top assembly 143 is parallel to the bottom 137 when the top assembly 143 is in a closed position, shown in FIGS. 6 and 9. When the top assembly 143 is in the closed position, an upper rectangular opening 145 is defined by a pair of upper edges 146 of the lateral sides 141 and an upper edge 147 of the bottom 137. The top assembly 143 and the bottom 137 of the first box 135 may be made of a thin sheet of steel so that magnetic playing pieces will stick to the top and bottom surfaces of the first box 135.

The alternate folding tray 105 also includes a second box 148 having a bottom 149, a pair of lateral sides 153, and an end 156. The sides 153 and the end 156 are connected to the bottom 149 at substantially right angles. The second box 148 is slightly smaller than the first box 153, so that the second box 148 may be inserted into the upper rectangular opening 145 of the first box 135. The second box 148 may be moved between an open position, shown in FIGS. 6, 8 and 9, and a closed position, shown in FIG. 7. In the open position, the second box 148 is away from the base member 106. In the closed position, the second box 148 is substantially inside to the first box 135. The bottom 149 of the second box 148 may be made of a thin sheet of steel, so that magnetic playing pieces will stick to either surface of the bottom 149.

The second box 148 also has an inner partition 157 to divide the box 148 into sections. A small section adjacent to the end 156 of the box 148 is convenient for storing small pieces, such as game pieces, pens, pencils, or color markers. The small section of the box 148 is covered with a sliding door 158, which can be moved between a pair of non-moving top surfaces 159. One of the top surfaces 159 has a circular hole 161 for holding a cup. The exterior edges of the second box 148 are rounded and padded as an additional safety feature.

When the second box 148 is in the open position, the top assembly 143 slides between the first and second boxes 135 and 148 on the pair of shelves 144 of the first box 135 and a similiar pair of shelves 163 of the second box 148. Each of the shelves 163 are affixed to one of the sides 153 near one of the free edges of the sides 153, but lower than the shelves 144 of the first box 135. Thus, the shelves 163 are positioned between the shelves 144 of the first box 135 and the bottom 149 of the second box 148 when the second box 148 is in the closed position. A plurality of notches 165 on the upper interior edges of the shelves 144 and 163 hold the top assembly 143 in a selected position. The selected position shown in FIG. 8 forms an easel, which may be used to hold a book 164. A ledge 165 on the upper surface of the top assembly 143 holds the book 164 in position.

Figure 9:
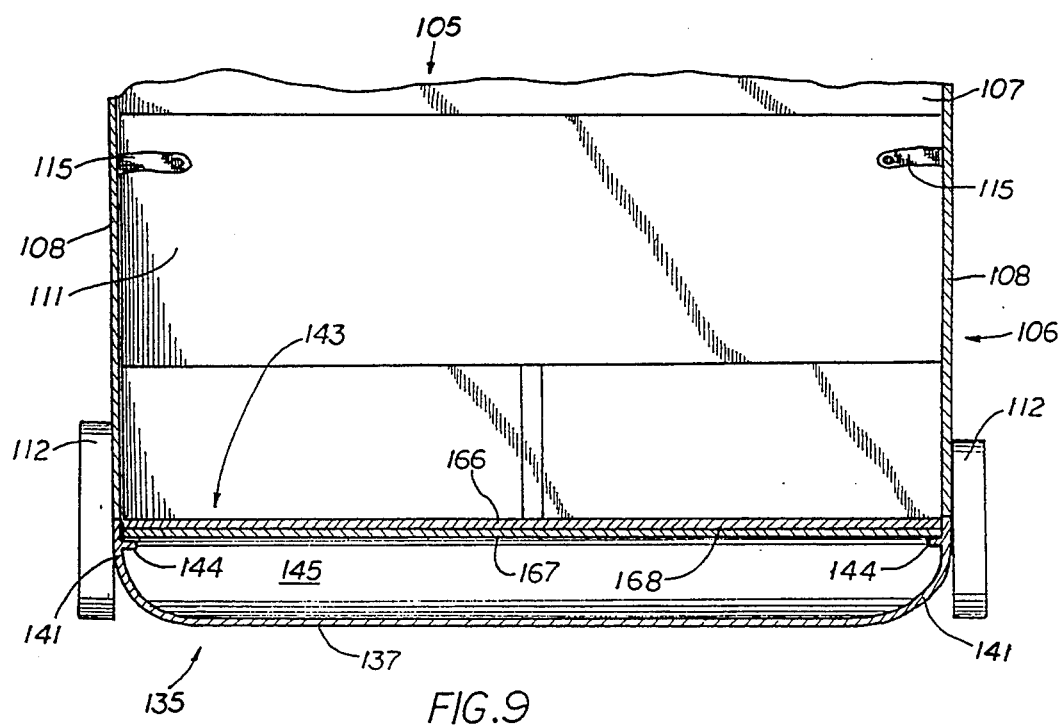
FIG. 9 is a sectional view along lines 9—9 in FIG. 6.

The top assembly 143 includes a distal section 166 and a proximate portion 166, connected by a hinge 168. The distal portion 166 of the top assembly 143 covers a substantial portion of the first box 135 when said distal portion 166 is in a closed position. The proximate portion 167 of the top assembly 143 can pivot in either direction between a closed position substantially adjacent to the distal portion 166, as shown in FIG. 9, and an open position for substantially covering both the first and the second boxes, 135 and 148, when the second box 148 is in the open position. The top assembly 143 may be placed into an easel position, shown in FIG. 8, by raising the hinged connection. The notches 165 on the shelves 144 and 163 hold the top assembly 143 in a selected position.

When the folding tray 105 is removed from the vehicle seat back 118, a pair of adjacent handles 169 on the upper sides 109 and 156 facilitate handling of the folding tray 105. The handles 169 fold down flat against the sides 109 and 156 when the boxes 135 and 148 are in the open position. A clamp 170 on the second box 148 adjacent to the handle 169 grasps a corresponding portion of the upper side 156 of the second box 148 to secure the folding tray 105 in a closed position, as shown in FIG. 7.

The folding tray of the invention has several advantages over the prior art. The folding tray provides two boxes for holding supplies. The tops of the boxes can be opened and set into notches to provide an easel for holding a book at a selected angle. Further, the folding tray can be readily folded to a closed position against the vehicle seat on which it is mounted, or may be removed from the vehicle seat completely for use as a portable container.

The invention has been described in only two embodiments. It should be apparent to those skilled in the art that the invention is not so limited, but is susceptible to various other changes and modifications without departing from the spirit of the invention.

I claim:

1. A folding tray for attachment to a vehicle seat back, comprising:

a base member;

a mounting harness for attaching the base member to the seat back, wherein the mounting harness includes a pair of straps attached between the bottom of the seat back and a headrest on the seat back and wherein a pair of projections are affixed on the base member for insertion into a pair of corresponding holes in the straps of the mounting harness;

a first box, having a bottom, a top, and a plurality of sides, wherein the first box is connected to the base member and can be pivoted between a closed position upward toward the seat back, and an open position downward away from the seat back; and a second box, having a bottom, a top, and a plurality of sides, wherein the second box is connected to the first box and can be moved between a closed position in which the second box is near the seat back, and an open position in which the second box is away from the seat back.

* * * * *